June 23, 1959 A. C. LUTHER, JR., ET AL 2,892,025

IMAGE SIGNAL CORRECTION APPARATUS

Filed May 11, 1954 2 Sheets-Sheet 1

INVENTORS
ARCH C. LUTHER, JR. &
IRVING BOSINOFF
BY
ATTORNEY

June 23, 1959 A. C. LUTHER, JR., ET AL 2,892,025

IMAGE SIGNAL CORRECTION APPARATUS

Filed May 11, 1954 2 Sheets-Sheet 2

INVENTORS
ARCH C. LUTHER, JR. &
IRVING BOSINOFF
BY
ATTORNEY

United States Patent Office 2,892,025

Patented June 23, 1959

2,892,025

IMAGE SIGNAL CORRECTION APPARATUS

Arch C. Luther, Jr., Merchantville, and Irving Bosinoff, Haddon Heights, N.J., assignors to Radio Corporation of America, a corporation of Delaware Application May 11, 1954, Serial No. 429,014

8 Claims. (Cl. 178—7.1)

The present invention relates to new and improved image signal correction apparatus and, more particularly, to apparatus known in the art as "gamma" correction circuitry.

In the television field, for example, where an image is divided into a plurality of elemental areas by a scanning process, so that information regarding its elemental light values may be transmitted in the form of a signal train, it is necessary for proper image reconstruction that the signalling system have a predetermined transfer gradient. That is to say, image-reproducing devices such as the kinescopes now in use have a non-linear light-output versus signal-input characteristic approximating a power law. Moreover, television camera pickup tubes are also inherently non-linear devices. While some well-known types of image pickup tubes have a characteristic such that a certain amount of compensation for the kinescope non-linearity is inherently afforded, the television system nevertheless requires gamma correction means for insuring an overall transfer gradient of the proper value.

The matter of gamma correction is of even greater importance in the color television art where it is necessary to introduce nonlinear amplification of the selected component color signals in order to obtain correct colorimetry in the system. Thus, for example, in the color television system presently standardized by the Federal Communications Commission, provision is made for gamma correction. In view of the close relationship required of the several component color signals in order for proper color image reproduction to be made, it has been found that the transfer characteristics for each of the several component color signals must match very closely the characteristics of the other signals for correct color balance.

By reason of the need for transfer gradient or gamma correction, many proposals have been made in the past for various types of apparatus capable of introducing a non-linear characteristic to television signals. It is well-known to those skilled in the art that any operation on the transfer characteristic of a television signal must be performed at some point in the television system where the direct current component of the signal is present, for otherwise the non-linearity imparted to the signal would vary in accordance with such extraneous parameters as average scene brightness and the like. Hence, most prior art proposals have required clamp circuits in the non-linear apparatus with subsequent direct coupling of the gamma circuit. Even with the provision of clamped circuits in the gamma correction apparatus, such practical problems of controlling the clamping level and compensating for different tube characteristics have resulted in problems of drifting, thereby necessitating complicated monitoring means for checking the operation of the gamma correction apparatus.

It is, therefore, a primary object of the present invention to provide new and simplified gamma correction means suitable for use in a color television system, which means affords substantially improved stability in the gamma correction performance.

In general, the present invention exploits the fact that conventional television image pickup apparatus inherently includes a point in which image "black level" necessarily corresponds to a fixed reference voltage. For example, conventional camera control or channel amplifier circuitry employed in conjunction with camera pickup devices includes a stage in which blanking signals are mixed with the video signals produced by the camera, such stage being followed by a linear clipper device which clips the blanking pulses in order to afford a "clean" pedestal upon which the synchronizing pulses may later be superimposed. At the output terminal of such a linear clipper device, therefore, black level inherently corresponds to a fixed reference voltage.

In accordance with the present invention, the gamma correction network for imparting the desired non-linear characteristic to the television signal is connected to constitute the load impedance of the linear clipper device which follows the blanking insertion stage of the camera control amplifier.

While the gamma circuits here provide a substantial improvement of stability, a major advantage is that the video operator can insure the proper non-linear characteristic of his camera by the ordinary procedure of setting gain and pedestal while observing the output signal only. Since this must be done in any event, no additional operational steps are required to obtain "setup" of the gamma.

As will become apparent from a description of a specific embodiment of the invention, the present invention obviates the need for complicated circuitry for insuring clamping of the signal during the gamma operation and provides such stability as is required in satisfying the exacting standards of a color television system.

Additional advantages of the present invention will become apparent to persons skilled in the art from a study of the following detailed description of the accompanying drawing in which.

Figure 1:
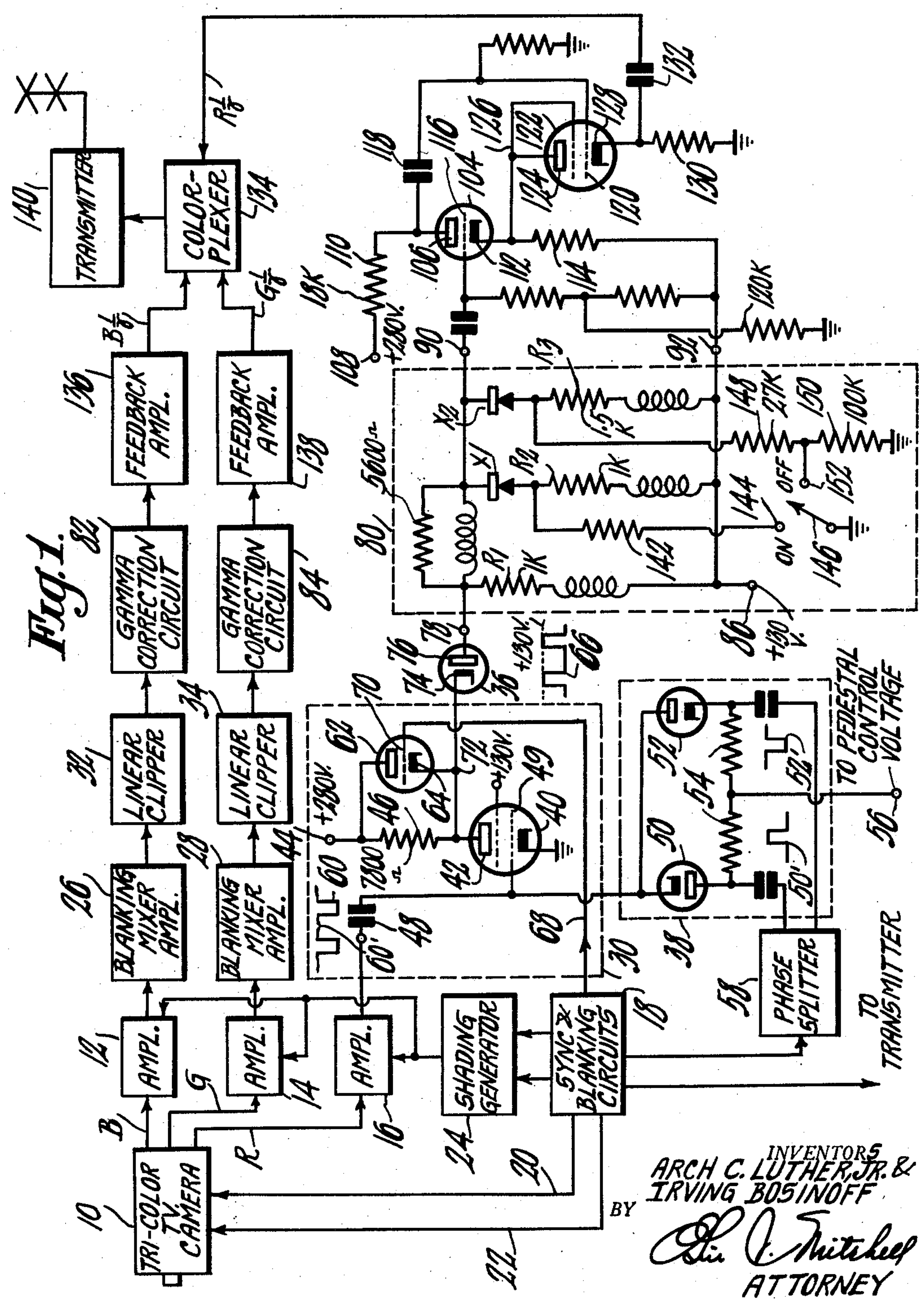
Fig. 1 is a block and schematic diagram of a color television pickup system embodying the principles of the present invention.

Referring to the drawing and, specifically, to Fig. 1 thereof, there is shown a representative form of color television image pickup system of a type now well-known in the art, insofar as its general arrangement is concerned. A scene to be televised in color is imaged onto a tricolor camera 10 which may, for example, be of the type described in detail in an article entitled "Image Orthicons for Color Cameras" by Neuhauser et al. which appeared in the January 1954 isue of Proceedings of the IRE. Suitable means for deriving the selected component color light images for application to the several image pickup tubes of the camera 10 are described in an article entitled "Image Orthicon Color Television Camera Optical System" by Sachtleben et al. which appeared in the March 1952 issue of RCA Review. As will be understood from the foregoing publications, the camera 10 provides three selected component color image signals, blue, green and red, for example, as indicated by the reference characters "B," "G" and "R." These component color signals are, respectively, applied to amplifiers 12, 14 and 16 after suitable preamplification and aperture correction, as described in detail in an article entitled "The RCA Color Television Camera Chain" by J. D. Spradlin which appeared in the above-cited issue of RCA Review. The Spradlin article describes a complete color camera chain of the type with which the present invention may be satisfactorily employed so that a detailed description of the various elements of the chain need not be made herein.

Also provided in the diagram of Fig. 1 are the scanning synchronization and camera blanking circuits indicated by a block 18, the synchronizing information produced by the block 18 being applied via leads 20 and 22 to the beam deflection apparatus associated with the pickup tubes of camera 10. In order to compensate for certain non-uniformities of the pickup tubes themselves, a shading generator 24 is conventionally provided for applying shading correction signals to the amplifiers 12, 14 and 16 for producing the necessary compensation of the component color signals. The shading correction arrangement does not form a part of the present invention and may, therefore, take any suitable form. One arrangement which may be employed is that described and claimed in the copending United States application of Luther, Bosinoff and Marian, Serial No. 365,438, filed July 1, 1953, for "Television Control System." The matters of shading correction are also defined fully in United States Patent No. 2,312,054, granted February 23, 1943 to O. H. Schade for "Television Shading Control Circuit."

The component color signals are applied from the amplifiers 12, 14 and 16, respectively, to the blanking insertion or mixer amplifiers 26, 28 and 30. Each of the last-recited amplifiers performs the well-known function of adding the blanking signals to the video signals produced by the camera 10, whereby to establish a noise-free "black level" or reference level from which the image-reproducing apparatus may measure the relative brightness of the elemental areas of the image. Each of the blanking insertion amplifiers is followed by a linear clipper device, these devices being designated by reference numerals 32, 34 and 36.

As has been stated previously supra, prior art proposals for gamma correction of television signals have, in view of the necessity that the signal being operated upon be possessed of its D.C. component, provided elaborate schemes for insuring that the signal be clamped to a fixed reference level. In accordance with the present invention, use is made of the fact that the stage in which the blanking signals are added to the video signals normally includes a device such as the keyed clamp circuit illustrated within the dotted line rectangle 38 for clamping the video signal to a reference potential. Circuitry suitable for performing the function of blanking insertion is illustrated schematically within the dotted line rectangle 30 and includes an amplifier 40 whose anode 42 is connected to a source of positive operating potential at terminal 44 via a load resistance 46. The amplifier illustrated within the rectangle 30 is connected in the red signal channel so that it should be understood that the amplifiers 26 and 28 in the blue and green channels may be identical to that shown.

The red video signal from amplifier 16 is coupled via capacitor 48 to the control electrode 49 of the amplifier 40. Also connected to the control electrode 49 is the keyed clamp circuit 38 comprising the oppositely polarized diodes 50 and 52 and a serially connected resistor 54 whose midpoint is connected to terminal 56, designated for connection to a supply "pedestal control voltage." The keyed clamp circuit 38 is provided with keying pulses 50′ and 52′ produced by a phase splitter circuit 58 which is supplied with horizontal synchronizing pulses from the circuitry 18. The clamp circuit 38 is of the type described and claimed in United States Patent No. 2,299,945, granted October 27, 1942 to K. R. Wendt for "Direct Current Reinserting Circuit." Briefly, the operation of the circuit 38 is such that, upon the occurrence of the keying pulses 50′ and 52″ the diodes 50 and 52 are similtaneously rendered capable of conduction, whereby to connect that terminal of capacitor 48 adjacent the control electrode 49 to the reference voltage terminal 56. In conventional operation of a keyed clamp circuit of the type shown, the terminal 56 may be supplied with a variable bias potential of such value as to clamp the recurrent blanking portions 60 of the video signal 60′ to picture "black level." Where desired, the pedestal control voltage applied to terminal 56 may clamp the signal portion 60 to a value slightly higher than blank level, where "set up" is being used.

Connected across the load resistance 46 in the manner shown is a triode 62 whose cathode 64 is connected directly to the anode 42 of amplifier 40. Blanking signals in the form of pulses 66 are applied via lead 68 from the circuitry 18 to the control electrode 70 of the triode 62. These blanking pulses 66 are of equal amplitude and are referenced to a fixed direct current potential, as shown, and cause the triode 62 which is normally nonconductive to conduct heavily during their occurrence. Such conduction of the triode 62 effectively shunts the load resistance 46 of amplifier 40 and raises the potential of terminal 72 to the potential to which the blanking pulses themselves are referenced, as will be appreciated.

Terminal 72 is, in turn, directly connected to the cathode 74 of the linear clipper diode 36. The anode 76 of the clipper 36 is connected to the input terminal 78 of the gamma correction network 80, so that the network 80 effectively serves as the load impedance of the clipper device. The gamma correcting network 80 in the red signal channel is duplicated by the circuits 82 and 84 in the blue and green signal channels, respectively.

From the foregoing, it will be understood that, by virtue of the connection of the clipper anode 76 through resistor $R_1$ to the positive potential terminal 86, the diode 36 will normally conduct for the video portions of the composite signal but will be cut off by the blanking pulses 66, so that terminal 78 will be effectively brought to the potential of terminal 86 during the blanking pulses. Stated otherwise, the biasing of the clipper diode 36 from terminal 86 is such that the voltage between terminals 78 and 86 is zero during the blanking pulses. In this way, once the camera operator has adjusted the pedestal control voltage at terminal 56 so that picture black level corresponds to the blanking level (or slightly higher than blanking level when "set up" is being used), black level is exactly related to the blanking level zero current condition in the diode load impedance between terminals 78 and 86. The load impedance actually constitutes the gamma correcting network 80, as has been set forth. Specifically, the gamma correction network is located between the input terminal 78 and output terminals 90 and 92 and may comprise a "plug-in" unit such that a network having a given gamma value may be removed and replaced by another unit having a different "gamma value." In addition to the input resistor $R_1$, the network shown includes a first non-linear path comprising the series arrangement of crystal diode $X_1$ and resistor $R_2$, the biasing for diode $X_1$ being provided from terminal 86 through resistor $R_2$. A second shunt path in the network comprises the series arrangement of a crystal diode $X_2$ and a resistor $R_3$ for providing the desired bias for the diode from terminal 86. Each of the shunt paths further includes a peaking inductance whose function is that of accentuating the high frequencies, as is well-known in the art.

Figure 2:
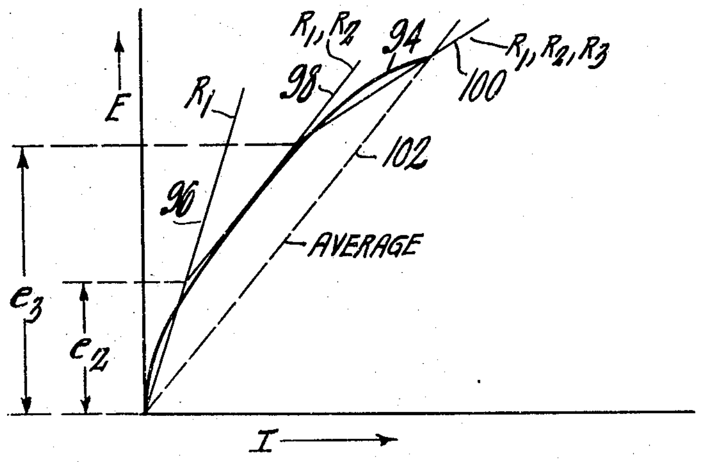
Fig. 2 depicts a series of curves useful in describing the operation of the invention.
Figure 3:
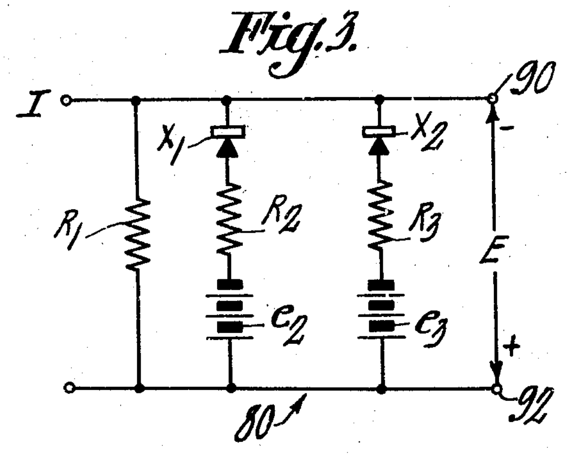
Fig. 3 is a schematic, simplified illustration of one form of gamma correction circuitry which may be employed in the invention.

The operation of the gamma correction network 80 may perhaps be more readily apparent from Figs. 2 and 3 which illustrate diagrammatically the manner in which the network 80 synthesizes the desired non-linear transfer characteristic. In Fig. 2, the solid curve 94 represents an illustrative gamma curve such as might be used in compensating for the power law characteristic of television image reproducing devices. Fig. 3 is a simplified schematic diagram of the gamma correction network and its components are designated by the same reference numerals as those employed in Fig. 1. Thus it is seen that the network 80 comprises basically three parallel paths, the first of which comprises the resistor $R_1$, the second of which includes crystal diode $X_1$ and resistor $R_2$, the biasing source being indicated schematically by the battery $e_2$. The third path includes a crystal diode $X_2$ and resistor $R_3$, the bias for that crystal being indicated by battery $e_3$. The total current through the network is represented by the symbol "I," while the voltage across the output terminals 90 and 92 is represented by reference character "E." With the crystal diodes biased as shown in Figs. 1 and 3, the non-linear characteristic of the network follows the solid curve 94 of Fig. 2 and is developed in the following manner: in Fig. 2 the straight line 96 is the load line for the circuit consisting of the resistor $R_1$. The straight line 98 represents the net load line presented by the parallel combination of resistors $R_1$ and $R_2$ (when the signal amplitude increases sufficiently to overcome the bias $e_2$ whereby to cause conduction of the diode $X_1$). Finally, the straight line 100 is representative of the condition which obtains when the signal amplitude overcomes the bias $e_3$ to cause conduction of crystal diode $X_2$, so that the net load comprises the parallel combination of resistors $R_1$, $R_2$ and $R_3$. The average load is represented by the dashed line 102 and will be understood as being indicative of the average impedance presented by the network 80 to signals from the linear diode clipper 36 of Fig. 1.

From the foregoing, it will be understood that the transfer characteristic of the network 80 is extremely stable by reason of the fact that the level across the network is sufficiently high and the impedance in series with each of the diodes is sufficiently great to render substantially negligible the characteristics of the individual diodes. Moreover, it is important to note that the bias required for the diodes presents none of the problems which would exist if there were an initial "black current" to overcome as is the case with conventional arrangements. That is to say, and as has been pointed out above, the diode clipper 36 is cut off by blanking pulses, so that the voltage across the network 80 is exactly zero for black level. The network shown in Fig. 1 with components of the values indicated therein provides, in practice, a circuit having a gamma equal to 0.7 and it has been found by measurement that, despite tolerances as to voltage, gain and the manufacturing tolerances of the components themselves, the gamma value may be maintained within 1% of its desired value merely by insuring proper setting of the pedestal control voltage at terminal 56 and the gain of the amplifier stage with which it is associated.

In practice, certain measurements of television camera equipment require a linear amplification for the camera output signals. Hence, the gamma controlling apparatus of the present invention includes an arrangement whereby the gamma network may be effectively "switched" out of operation while not changing the overall gain of the network. Generally this is accomplished by selecting the slopes of the straight line characteristics in Fig. 2 which are used in synthesizing the "gamma curve" 94 in such manner that one of the slopes is equal to the average slope 102 of the "gamma curve." In Fig. 2, therefore, it may be seen that the straight line 98 which is the effective impedance presented by the parallel combination of resistors $R_1$ and $R_2$ is parallel to the average line 102. The specific circuitry for accomplishing the switching will now be described. A large resistor 142 is connected at one end to the junction of the crystal diode $X_1$ and resistor $R_2$ and its other terminus includes a stationary switch contact 144 designated "on." Movable switch member 146 which is connected to ground is normally in electrical contact with the terminal 144 during the operation of the network as a gamma correcting circuit. That is to say, during gamma correcting operation, the bias for diode $X_1$ is actually provided by a voltage dividing arrangement which may be traced from terminal 86 through resistor $R_2$ and resistor 142 to ground. The voltage division between resistors $R_2$ and 142 is such as to provide the bias $e_2$ indicated in Figs. 2 and 3. Also during the gamma correcting operation, the bias for diode $X_2$ is derived through the voltage dividing network comprising, in one leg the resistor $R_3$, and in the other leg, the resistors 148 and 150. The voltage division of this latter arrangement provides the bias $e_3$ for the crystal diode $X_2$. Connected between resistors 148 and 150, however, is a second switch terminal 152 designated "off." When it is desired to present a linear impedance (as opposed to the non-linear impedance of the network 80 when it is operating for gamma correction), the movable switch terminal 146 is rotated to make contact with the terminal 152, thereby breaking the circuit with resistor 142 and short-circuiting the resistor 150 to ground. In this state of the circuit, the bias presented to the crystal diode $X_1$ is such that the diode is rendered fully conducting for all signal levels within the usual range, since there is no direct current potential across the resistor $R_2$. Also in this state, the voltage division which provides bias for the diode $X_2$ is determined by the resistors $R_3$ and 148 which is such as to render the diode $X_2$ completely nonconducting. Thus it will be understood that in the "off" position of the switch, the impedance presented by the circuit 80 is the net impedance of the parallel arrangement of resistors $R_1$ and $R_2$ only, since resistor $R_3$ is effectively open-circuited. In this manner, the net impedance of the circuit 80 is that indicated by the straight line 98 which is parallel to the average slope line 102 of the gamma curve, so that the gain of the network is unchanged, although the impedance has been changed from a non-linear impedance to a linear one.

The output terminals 90 and 92 are coupled to the input of a feedback amplifier arrangement comprising the triode 104 whose anode 106 is connected to a positive potential terminal 108 through a load resistor 110. The cathode 112 of triode 104 is connected to the positive terminal 86 through a cathode resistor 114. With the signal from the gamma correction network applied to its control electrode 116, the triode 104 provides at its anode an output signal which is a replica of the input signal (with reversed polarity) and the output signal is coupled via capacitor 118 to the control electrode 120 of tube 122. The anode 124 of the tube 122 is connected directly via lead 126 to the cathode 112 of amplifier 104, so that the load circuit of the output tube 122 may be traced through the resistor 114 to terminal 86. The cathode 128 of tube 122 is connected to ground through an unbypassed resistor 130 and the signal output from tube 122 is taken from the cathode 128.

The arrangement of tubes 104 and 122 comprises a feedback circuit which operates generally as follows: it is necessary that the output amplifier from the gamma control network have a highly stabilized gain. Since the output signal from the anode 106 of tube 104 is applied to the control electrode of the tube 122 whose anode circuit includes the cathode resistor 114 of amplifier 104, a negative current feedback is afforded, so that the tube 122 causes the cathode 112 of tube 104 to regulate the gain of that tube in such manner as to restrict it closely to unity gain. Stated otherwise, when tube 104 attempts to amplify the signal applied to it across terminals 90 and 92, the tube 122 draws an amount of current through the cathode resistor 114 of tube 104 which is sufficient to raise the potential of the cathode 112 to the point where the gain between the control electrode 116 and the cathode 112 of tube 104 is substantially unity. The output signal from the feedback arrangement is coupled from the cathode 128 of feedback tube 122 through capacitor 132 to the input of a colorplexer 134 and comprises the gamma-corrected red component color signal indicated as $$R^{\frac{1}{\gamma}}$$

The corresponding gamma-corrected blue and green color signals from networks 82 and 84 are similarly amplified in feedback amplifier arrangements 136 and 138, respectively, and are applied to the colorplexer 134 as the signals $$B^{\frac{1}{\gamma}} \text{ and } G^{\frac{1}{\gamma}}$$

The colorplexer per se does not constitute a part of the present invention but will be understood by those skilled in the art as comprising suitable matrixing circuits for deriving selected proportions of the several color signals which may, for example, comprise the standard "I" and "Q" signals standardized by the Federal Communications Commission on December 17, 1953, and described in an article entitled "NTSC Signal Specifications" which appeared in the January 1954 issue of Proceedings of the IRE. The signals produced by the colorplexer 134 are then applied in a suitable manner to the transmitter 140 for transmission.

While the invention has been described in a complete color camera chain in the interest of completeness of disclosure, it will be understood that its utility and advantageous aspects are not limited to an environment of the type shown. Rather, the invention may be viewed as providing a simplified arrangement for gamma correction of an image signal by locating a non-linear impedance at a point in a signal channel where the signal necessarily is clamped to a fixed reference level during recurrent intervals. The specific location of the gamma correcting network in accordance with the described embodiment of the invention is at the output of the linear clipper device which follows the blanking signal insertion stage of the signal channel, since the clipper device is necessarily cut off during the blanking impulses so that black level for the signal is exactly related to the blanking level zero current condition which obtains in the load circuit of the clipper.

Having thus described our invention, what we claim as new and desire to secure by Letters Patent is:

1. In an image signal processing channel which includes a source of image signal having their direct current component such that regularly recurrent portions of said signals representative of a predetermined image brightness level are fixed at a reference potential level, a source of regularly recurrent pulses of fixed amplitude and occurring in time substantially simultaneously with said regularly recurrent signal portions, and adder means for combining said pulses with said image signals to produce a composite signal whose image-representative portions extend in a given potential direction and whose regularly recurrent pulse portions extend in the opposite direction, the combination which comprises: unilaterally conductive clipping means having a first electrode and a second electrode; a source of operating potential for said unilaterally conductive means of such value as to render said means non-conductive for signals of the polarity of said recurrent pulse portions; a direct current connection for applying such composite signals from said adder means to said first electrode; and an impedance having a non-linear signal transfer characteristic connected between said second electrode and said source of operating potential for imparting a non-linear gamma characteristic to said signals, said impedance comprising a first resistive means of a certain value and a unilaterally conductive path including second resistive means in parallel with said first resistive means; and means including said source of operating potential for determining the threshold of conduction of said unilaterally conductive path.

2. In an image signal processing channel which includes a source of image signals containing their direct current component such that regularly recurrent portions of said signals representative of a predetermined image brightness level are fixed at a reference potential level, a source of regularly recurrent pulses of fixed amplitude and occurring in time substantially coincidentally with said regularly recurrent signal portions and adder means for combining said pulses with said image signals to produce a composite signal whose image-representative portions extend in a given potential direction and whose regularly recurrent pulse portions extend in the opposite direction, the combination which comprises: unilaterally conductive means having a first electrode and a second electrode; a source of operating potential for said unilaterally conductive means of such value as to render said means non-conductive for signals of the polarity of said recurrent pulse portions; a direct current connection for applying such composite signals from said adder means to said first electrode; and a load circuit connecting said second electrode to said source of operating potential for altering the gamma of said signals, said load circuit comprising a first resistive path, a second resistive path in shunt with said first path and containing a unilaterally conductive device and means including said source of operating potential for determining the point of conduction of said unilaterally conductive device in said shunt path.

3. The invention as defined by claim 2 which includes means for selectively rendering said last-named unilaterally conductive path fully conductive.

4. In an image signal processing channel which includes a source of image signals containing their direct current component such that regularly recurrent portions of said signals representative of a predetermined image brightness level are fixed at a reference potential level, a source of regularly recurrent pulses of fixed amplitude and occurring in time substantially coincidentally with said regularly recurrent signal portions, and adder means for combining said pulses with said image signals to produce a composite signal whose image-representative portions extend in a given potential direction and whose regularly recurrent pulse portions extend in the opposite direction, the combination which comprises: unilaterally conductive means having a first electrode and a second electrode; a source of operating potential for said unilaterally conductive means of such value as to render said means nonconductive for signals of the polarity of said recurrent pulse portions; a direct current connection for applying such composite signals from said adder means to said first electrode; and a load circuit connecting said second electrode to said source of operating potential, said load circuit comprising a first resistive path, a second resistive path in shunt with said first path and containing a unilaterally conductive device, a third resistive path in shunt with said first and second resistive paths and including a unilaterally conductive device, and biasing means including said source of operating potential for determining the respective points of conduction of said unilaterally conductive devices in said second and third resistive paths, said points of conduction being at different levels of signal amplitude, whereby said load circuit has a certain non-linear signal transfer characteristic having a predetermined average slope for imparting a predetermined non-linearity to said signals.

5. The invention as defined by claim 4 which further includes a switch connected to said biasing means for selectively changing the bias of said unilaterally conductive means in said resistive paths in such manner as to render said second resistive path fully conductive and to render said third resistive path non-conductive for any signal level within the range of said composite signals.

6. The invention as defined by claim 4 wherein the respective impedances of said paths are of such value that the net impedance of said first and second resistive paths is of a slope parallel to said average non-linear characteristic.

7. In a television camera apparatus which includes image scanning pickup device for providing a train of television image signals including blanking pedestals, means for clamping said pedestals to a reference potential level, a source of blanking pulses of fixed amplitude, and adder means coupled to said source and to said clamping means for combining said pulses with said image signals to produce a composite signal, the combination comprising: a linear clipper device having a first electrode and a second electrode; a direct current connection for applying such composite signal from said adder means to said first electrode; a source of operating potential for said clipper device of such value as to cause said clipper device to clip the blanking pulses from said composite signal; and a non-linear impedance connecting said second electrode of said clipper device to said source of operating potential therefor, said impedance having a predetermined signal-transfer characteristic for imparting to such composite signal a predetermined non-linearity.

8. In a television camera apparatus which includes image-scanning pickup for providing a train of television image signals including blanking pedestals, means for clamping said pedestals to a reference potential level, a source of blanking pulses of fixed amplitude, and adder means coupled to said source and to said clamping means for combining said pulses with said image signals to produce a composite signal, the combination comprising: a linear clipper device having a first electrode and a second electrode; a direct current signal connection from said adder means to said first electrode; a source of operating potential for said clipper device of such value as to cause said clipper device to clip the blanking pulses from said composite signal; and a non-linear impedance connecting said second electrode of said clipper device to said source of operating potential therefor, said impedance having a predetermined signal-transfer characteristic for imparting a predetermined non-linearity to said composite signal.

References Cited in the file of this patent

UNITED STATES PATENTS

| | | |
|---|---|---|
| 2,620,392 | Lax | Dec. 2, 1952 |
| 2,636,133 | Hussey | Apr. 22, 1953 |
| 2,676,250 | Trousdale | Apr. 20, 1954 |

FOREIGN PATENTS

| | | |
|---|---|---|
| 148,002 | Australia | Sept. 2, 1952 |